United States Patent
Mitsuhashi

(10) Patent No.: US 11,549,763 B2
(45) Date of Patent: Jan. 10, 2023

(54) PLATE FIN HEAT EXCHANGER AND REPAIR METHOD FOR PLATE FIN HEAT EXCHANGER

(71) Applicant: Kobe Steel, Ltd., Kobe (JP)

(72) Inventor: Kenichiro Mitsuhashi, Takasago (JP)

(73) Assignee: Kobe Steel, Ltd., Kobe (JP)

( * ) Notice: Subject to any disclaimer, the term of this patent is extended or adjusted under 35 U.S.C. 154(b) by 701 days.

(21) Appl. No.: 16/673,236

(22) Filed: Nov. 4, 2019

(65) Prior Publication Data

US 2020/0064083 A1 Feb. 27, 2020

Related U.S. Application Data

(62) Division of application No. 13/910,335, filed on Jun. 5, 2013, now abandoned.

(30) Foreign Application Priority Data

Aug. 21, 2012 (JP) ................................ 2012-182468

(51) Int. Cl.
*B23P 15/26* (2006.01)
*F28F 3/02* (2006.01)
(Continued)

(52) U.S. Cl.
CPC ............... *F28F 3/02* (2013.01); *B23P 15/26* (2013.01); *F28D 9/0062* (2013.01); *F28F 11/00* (2013.01);
(Continued)

(58) Field of Classification Search
CPC .................. F28D 9/0062; F28D 9/0068; F28F 2265/12; B23P 15/26; B23P 6/00
See application file for complete search history.

(56) References Cited

U.S. PATENT DOCUMENTS 3,451,473 A 6/1969 Urie et al.
3,590,914 A 7/1971 Duncan
(Continued)

FOREIGN PATENT DOCUMENTS

JP H05-277301 10/1993
JP 7-167580 A 7/1995
(Continued)

OTHER PUBLICATIONS

Extended European Search Report dated Jan. 28, 2014, in Patent Application No. 13170568.3.
The Standards of The Brazed Aluminium Plate-Fin Heat Exchanger, Manufacturers' Association, Second Edition, 2000. pp. 1-78.
M.A. Taylor, Plate-Fin Heat Exchangers Guide to Their Specification and Use, 1$^{st}$ Edition 1987, pp. 1-138.
(Continued)

*Primary Examiner* — Eric S Ruppert
(74) *Attorney, Agent, or Firm* — Oblon, McClelland, Maier & Neustadt, L.L.P.

(57) ABSTRACT

In a heat exchanger of the present invention, a release port for, in a case where a fluid flows into an internal space, releasing the fluid to an exterior is provided in a protection unit main body of each of protection units arranged on both outer sides of a heat exchange unit, and a protection unit fin plate of the protection unit has such strength that a coupling state between an outer surface of an outermost-layer partition plate and a bonding plate of the protection unit main body facing the outer surface is maintained even in a case where an inner pressure set as a design pressure for a part of the heat exchange unit constituting an outermost-layer flow passage adjacent to the protection unit is applied to the internal space of the protection unit main body of the protection unit.

6 Claims, 10 Drawing Sheets

(51) Int. Cl.
  *F28F 27/00* (2006.01)
  *F28D 9/00* (2006.01)
  *F28F 11/00* (2006.01)

(52) U.S. Cl.
  CPC .............. *F28F 27/00* (2013.01); *F28F 3/025* (2013.01); *F28F 2265/16* (2013.01); *Y10T 29/49352* (2015.01)

(56) References Cited

U.S. PATENT DOCUMENTS

| | | |
|---|---|---|
| 5,035,284 A | 7/1991 | Oya et al. |
| 6,321,566 B1 | 11/2001 | Yamamoto |
| 2001/0017200 A1 | 8/2001 | Noishiki |
| 2001/0047862 A1 | 12/2001 | Anderson |
| 2002/0036078 A1 | 3/2002 | Janezich et al. |
| 2007/0137841 A1 | 6/2007 | Bjork |
| 2010/0263823 A1 | 10/2010 | Mitsuhashi et al. |
| 2011/0017429 A1* | 1/2011 | Bosquain ................. F25J 5/002 165/104.19 |
| 2011/0258853 A1* | 10/2011 | Saulnier ................... F28F 11/00 29/890.031 |

FOREIGN PATENT DOCUMENTS

| | | |
|---|---|---|
| JP | 2002-107089 A | 4/2002 |
| JP | 2010-249475 A | 11/2010 |
| WO | WO 1989/005951 | 6/1989 |

OTHER PUBLICATIONS

W. Diery, Hollriegelskreuth, Manufacturing of Large Aluminium Plate-Fin Heat Exchangers—Development From Dip Brazing to Vacuum Brazing, pp. 1-5.

* cited by examiner

PLATE FIN HEAT EXCHANGER AND REPAIR METHOD FOR PLATE FIN HEAT EXCHANGER

CROSS-REFERENCE TO RELATED APPLICATION

The present application is a Divisional Application of U.S. patent application Ser. No. 13/910,335, filed on Jun. 5, 2013, which claims priority under 35 U.S.C. § 119(b) to Japanese application 2012-182468, filed on Aug. 21, 2012, the entire contents of each of which are incorporated herein by reference.

BACKGROUND OF THE INVENTION

Field of the Invention

The present invention relates to a so-called plate fin heat exchanger in which a fin plate is installed, and a repair method for the same.

Description of the Related Art

Conventionally, there is a known plate fin heat exchanger (hereinafter, also simply referred to as the "heat exchanger") described in Japanese Unexamined Patent Application Publication No. H7-167580. This heat exchanger is provided with a heat exchange unit in which a number of flow passages are aligned in laminated blocks called a core. Specifically, as shown in FIGS. 15 and 16, a heat exchange unit 100 is provided with a plurality of flat plate shape tube plates 102 arranged in parallel at intervals, a corrugated plate shape fin plate 104 arranged between the tube plates 102, and side bars 106 respectively arranged on both sides of the fin plate 104 so as to sandwich this fin plate 104 from both sides in the width direction. The side bars 106 arranged on both the sides of the fin plate 104 and the pair of tube plates 102 sandwiching the fin plate 104 and the side bare 106 from the upper and lower sides enclose a flow passage r accommodating the fin plate 104 between the side bare and the tube plate. The fin plate 104 is combined to the tube plates 102 at a plurality of positions placed at predetermined intervals between the side bare 106 (refer to FIG. 16). Thereby, heat of a fluid flowing in the flow passage r is transmitted from the fin plate 104 to the tube plates 102. In such a way, the heat exchange unit 100 has a configuration that a number of flow passages r are layered inside. A header for supplying the fluid (not shown) is welded so as to be connected to an inlet of the flow passage r.

In the heat exchanger, by letting respectively different types of fluids (such as a high-temperature fluid and a low-temperature fluid) flow in two flow passages r arranged on both sides of a predetermined tube plate 102 in the heat exchange unit 100, heat exchange is performed between the fluids flowing through the flow passages r via the tube plate 102. At this time, the fin plate 104 transmits heat of the fluid flowing through the flow passage r to the tube plate 102, and thereby efficiency of the heat exchange is improved.

The heat exchanger is generally provided with protection units 110 for protecting the heat exchange unit 100 from impact and external force applied at the time of installation of the heat exchanger or the like. The protection units 110 are respectively provided on both outer sides of the heat exchange unit 100 in the layering direction of the flow passages r (up and down direction in FIG. 16), and have internal spaces r1. Even when the impact and the external force are applied to the heat exchanger from both the outer sides in the layering direction of the flow passages r, the protection units 110 are only dented but prevent the inside heat exchange unit 100 from being dented. Each of the protection units 110 is formed by for example, side bars 112 which is the same as the side bars 106 of the heat exchange unit 100, an outer plate 114 bonded to the side bars 112 so as to face the outermost-layer tube plate 102 of the heat exchange unit 100, the outer plate forming the internal space r1 of the protection unit 110 together with the side bars 112 and the outermost-layer tube plate 102 of the heat exchange unit 100, and a corrugated plate shape plate (not shown) provided in the internal space r1, the plate for coupling the outermost-layer tube plate 102 of the heat exchange unit 100 and the outer plate 114.

In such a heat exchanger, when a radical temperature change is generated in the fluid flowing through the flow passage r in the heat exchange unit 100, the tube plates 102, the fin plate 104, and the side bars 106 are expanded or contracted. For example, in a case where a high-temperature fluid flows through the flow passage r with the heat exchange unit 100 in a low temperature state, the thick side bars 106 having large heat capacity are slowly expanded whereas the thin tube plates 102 and fin plate 104 having small heat capacity are quickly expanded in the vicinity of center in the width direction of the flow passage r. As a result, in the vicinity of the center in the width direction of the flow passage r, a gap between the tube plates 102 is extended more than vicinities of both ends in the width direction. Meanwhile, in a case where a low-temperature fluid flows through the flow passage r with the heat exchange unit 100 in a high temperature state, the tube plates 102 and the fin plate 104 are adversely quickly contracted in the vicinity of the center in the width direction of the flow passage r. Thus, the gap between the tube plates 102 is narrowed in comparison to the vicinities of both the ends in the width direction.

Generally, a number of (for example, hundreds of) flow passages r are layered in the heat exchange unit 100. Thus, on the outer side (on the upper side and the lower side in FIG. 16) from a center portion in the layering direction of the flow passages r, a deformation amount of the tube plate 102 from an initial state is increased. This is because deformation amounts of layers (flow passages r) are added up from the center portion to the outer side. For example, in a case where the above heat exchanger is used in a chemical plant, a radical temperature change in the fluid where the heat exchange is performed and plant start-up/stop are frequently repeatedly performed. In this case, the above deformation is repeatedly generated, and fatigue due to this repeated deformation is accumulated most in the outermost-layer tube plate 102 whose deformation amount is the largest. As a result, a probability that damage such as a hole or cracking is generated in the outermost-layer tube plate 102 is increased.

When damage such a hole or cracking is generated in the outermost-layer tube plate 102, the fluid flowing through the outermost-layer flow passage r flows into the internal space r1 of the protection unit 110 through this damaged part. For example, in a case where a liquefied gas flows into the internal space r1 of the protection unit 110 during a low-temperature operation, a radical pressure increase is generated the internal space r1 of the protection unit 110 at the time of heating after that and there is a fear that the protection unit 110 bursts. Therefore, a release hole is formed in the protection unit 110 and the internal space r1 is open to the atmosphere so as to release the gas flowing into the internal space r1 of the protection unit 110.

However, in the heat exchanger with the above configuration, when damage is generated in the outermost-layer tube plate 102 of the heat exchange unit 100, the fluid flows out from the release hole formed in the protection unit 110 to an exterior. Therefore, in order to continuously use this heat exchanger after that, there is a need for repair for stopping the fluid from flowing out to the exterior. For example, repair for sealing the outermost-layer flow passage r is performed in such a manner that the fluid does not flow into the outermost-layer flow passage r of the heat exchange unit 100. Thereby, the fluid can be prevented from flowing into the internal space r1 of the protection unit 110, and as a result, the fluid can be prevented from flowing out to the exterior.

However, such repair requires a considerably long working time. Thus, a stop period of the plant or the like where the heat exchanger is used is increased, so that a production loss becomes serious.

Specifically, at the time of this repair, tasks including detaching the header by cutting a welded part of the header for supplying the fluid which is welded to the heat exchange unit 100, sealing the exposed inlet of the outermost-layer flow passage r by welding, so that no fluid flows into the outermost layer flow passage r, and then welding the header for supplying the fluid again are performed. The tasks generally require as a long time as two to four weeks.

SUMMARY OF THE INVENTION

The present invention is achieved in order to solve the problems described above, and an object thereof is to, even in a case where a partition wall partitioning an outermost-layer flow passage of a heat exchange unit and an internal space of a protection unit adjacent to the flow passage is damaged and a fluid flows out from a release portion provided in the protection unit to an exterior, restore a heat exchanger into a state that no fluid flows out to the exterior and the heat exchanger has a sufficient pressure resistance performance for a short time.

In order to achieve the above object, a plate fin heat exchanger according to the present invention includes a heat exchange unit inside which a plurality of flow passages is provided so as to be layered and heat exchange is performed between fluids flowing through the flow passages, and a pair of protection units arranged on both outer sides of the heat exchange unit in the layering direction of the flow passages, the protection units for protecting the heat exchange unit, wherein the heat exchange unit has a plurality of partition walls aligned at intervals in such a manner that the flow passage is formed between the adjacent partition walls, and a heat exchange unit fin plate which is arranged in the flow passage for coupling the partition walls facing each other across the flow passage, the protection unit has a protection unit main body attached to the outermost partition wall so as to form an internal space between the protection unit main body and the outermost partition wall, and a protection unit fin plate arranged in the internal space of the protection unit main body, the protection unit fin plate for coupling an outer surface of the outermost partition wall and an inner surface of the protection unit main body facing the outer surface, a release portion for, in a case where the fluid flows into the internal space, releasing the fluid to an exterior is provided in the protection unit main body of the protection unit, and the protection unit fin plate of the protection unit has such strength that a coupling state between the outer surface of the outermost partition wall and the inner surface of the protection unit main body facing the outer surface is maintained even in a case where an inner pressure set as a design pressure for a part of the heat exchange unit constituting the outermost-layer flow passage adjacent to the protection unit is applied to the internal space of the protection unit main body of the protection unit. It should be noted that the strength of the protection unit fin plate is the concept including pressure-resistance strength of the protection unit fin plate (tensile strength in the layering direction of the flow passages), strength of a bonding portion of the protection unit fin plate to the outer surface of the outermost partition wall (bonding strength), and strength of a bonding portion of the protection unit fin plate to the inner surface of the protection unit main body (bonding strength).

In this plate fin heat exchanger, the protection unit fin plate of the protection unit has such strength that the coupling state between the outer surface of the outermost partition wall which is in contact with the protection unit fin plate and the inner surface of the protection unit main body facing the outer surface (bonding plate to be described later) is maintained even in a case where the inner pressure set as the design pressure for the part of the heat exchange unit constituting the outermost-layer flow passage adjacent to the protection unit is applied to the internal space of the protection unit. Thus, even when the inner pressure corresponding to the design pressure is applied to the internal space of the protection unit, the strength resistant against the inner pressure can be given to the protection unit. Therefore, even when the fluid flowing through the outermost-layer flow passage of the heat exchange unit flows into the internal space of the protection unit, the protection unit can be resistant against pressure of the fluid. As a result, the internal space of the protection unit can be used as part of the outermost layer flow passage of the heat exchange unit adjacent to the protection unit. Therefore, in a case where the heat exchanger is continuously used even after the outermost partition wall is damaged in the heat exchanger and the fluid flows into the internal space of the protection unit from the outermost-layer flow passage, only by bringing the release portion of the protection unit into a sealed state, the heat exchanger can be brought into a state that the heat exchanger has a sufficient pressure resistance performance while preventing the fluid from flowing out from the heat exchanger to the exterior. That is, the protection unit can be utilized as the heat exchange unit. Therefore, in this heat exchanger, the heat exchanger can be restored into a state that no fluid flows out to the exterior and the heat exchanger has a sufficient pressure resistance performance for a short time in comparison to the conventional plate fin heat exchanger requiring repair tasks of detaching the header for supplying the fluid by cutting the welded part, sealing the inlet of the outermost-layer flow passage, and welding the header for supplying the fluid again.

In the above plate fin heat exchanger, preferably, the protection unit fin plate of the protection unit has pressure-resistance strength which is not less than pressure-resistance strength of the heat exchange unit fin plate arranged in the outermost-layer flow passage adjacent to the protection unit.

With this configuration, the heat exchanger having a sufficiently safe pressure resistance performance can be formed after the repair. Specifically, the heat exchange unit fin plate generally has greater pressure-resistance strength than minimum pressure-resistance strength to resist against the design pressure in the part where the heat exchange unit fin plate is provided. Thus, according to the configuration, the protection unit fin plate has pressure-resistance strength which is not less than the heat exchange unit fin plate thereof. Therefore, with the configuration, the protection unit has a pressure resistance performance which is not less than a pressure resistance performance of the part of the heat exchange unit constituting the outermost-layer flow passage adjacent to the protection unit. As a result, the pressure resistance performance of the protection unit is a pressure resistance performance with sufficiently extra room for resisting against the inner pressure set as the design pressure for the part of the heat exchange unit constituting the outermost-layer flow passage adjacent to the protection unit. Therefore, in a case where the outermost partition wall is damaged and even in a case where the release portion of the protection unit is brought into a sealed state and the internal space of the protection unit is utilized as part of the outermost-layer flow passage of the heat exchange unit, the heat exchanger in which the protection unit exerts a sufficiently safe performance in terms of a pressure resistance performance can be formed.

In the above plate fin heat exchanger, preferably, a pressure resistance test already confirms that the protection unit has such a pressure resistance performance that the protection unit is not broken even when the inner pressure set as the design pressure for the part of the heat exchange unit constituting the outermost-layer flow passage adjacent to the protection unit is applied to the internal space of the protection unit main body of the protection unit.

With this configuration, the pressure resistance test already confirms the pressure resistance performance of the protection unit. Thus, even in a case where the fluid flows into the internal space of the protection unit from the outermost-layer flow passage and the release portion of the protection unit is brought into a sealed state, the internal space of the protection unit can be utilized as part of the outermost-layer flow passage adjacent to the protection unit at ease.

In the above plate fin heat exchanger, the release portion may include a release port formed in the protection unit main body, and a sealing material for sealing the release port in a state that the inner pressure of the internal space of the protection unit main body is not more than a predetermined pressure, whereas opening the release port in a case where the inner pressure of the internal space of the protection unit main body exceeds the predetermined pressure.

With this configuration, since the release port is sealed by the sealing material in a state that the fluid does not flow into the internal space of the protection unit main body, foreign substances, rainwater, and the like can be prevented from invading the internal space of the protection unit main body through the release port. In addition, in a case where the fluid flows into the internal space of the protection unit main body from the outermost-layer flow passage and the inner pressure of the internal space of the protection unit main body is increased, the release port can be opened so as to release the fluid from the internal space to the exterior.

It should be noted that in the above plate fin heat exchanger, preferably, a material of the heat exchange unit and the protection units is an aluminum alloy.

A repair method for a plate fin heat exchanger according to the present invention is a method for repairing the plate fin heat exchanger including a sealing step of bringing the release portion into a sealed state in a case where the outermost partition wall is damaged and a damage portion providing communication between the outermost-layer flow passage and the internal space of the protection unit main body is formed.

With this repair method for the plate fin heat exchanger, even in a case where the outermost partition wall is damaged and the fluid flows into the internal space of the protection unit from the outermost-layer flow passage of the heat exchange unit, only by performing the sealing step of bringing the release portion into a sealed state, the heat exchanger can be repaired into a state that no fluid flows out to the exterior and the heat exchanger has a sufficient pressure resistance performance. Therefore, the heat exchanger can be repaired into a continuously usable state for a short time.

In the above repair method for the plate fin heat exchanger preferably further includes an opening formation step of forming an opening for providing communication between the internal space of the protection unit main body and the outermost-layer flow passage adjacent to the internal space on the outermost partition wall.

With this configuration, in a case where the outermost partition wall is damaged, and the internal space of the protection unit is to be used as part of the outermost-layer flow passage of the heat exchange unit, the opening can be formed on the outermost partition wall so as to smoothen fluid distribution between the outermost-layer flow passage and the internal space of the protection unit.

As described above, according to the present invention, even in a case where the partition wall partitioning the outermost-layer flow passage of the heat exchange unit and the internal space of the protection unit adjacent to the flow passage is damaged and the fluid flows out from the release portion provided in the protection unit to the exterior, the heat exchanger can be restored into a state that no fluid flows out to the exterior and the heat exchanger has a sufficient pressure resistance performance for a short time.

DESCRIPTION OF THE PREFERRED EMBODIMENTS

Hereinafter, an embodiment of the present invention will be described with reference to the drawings.

Firstly, with reference to FIGS. 1 to 10, a configuration of a plate fin heat exchanger according to one embodiment of the present invention will be described.

Figure 1:
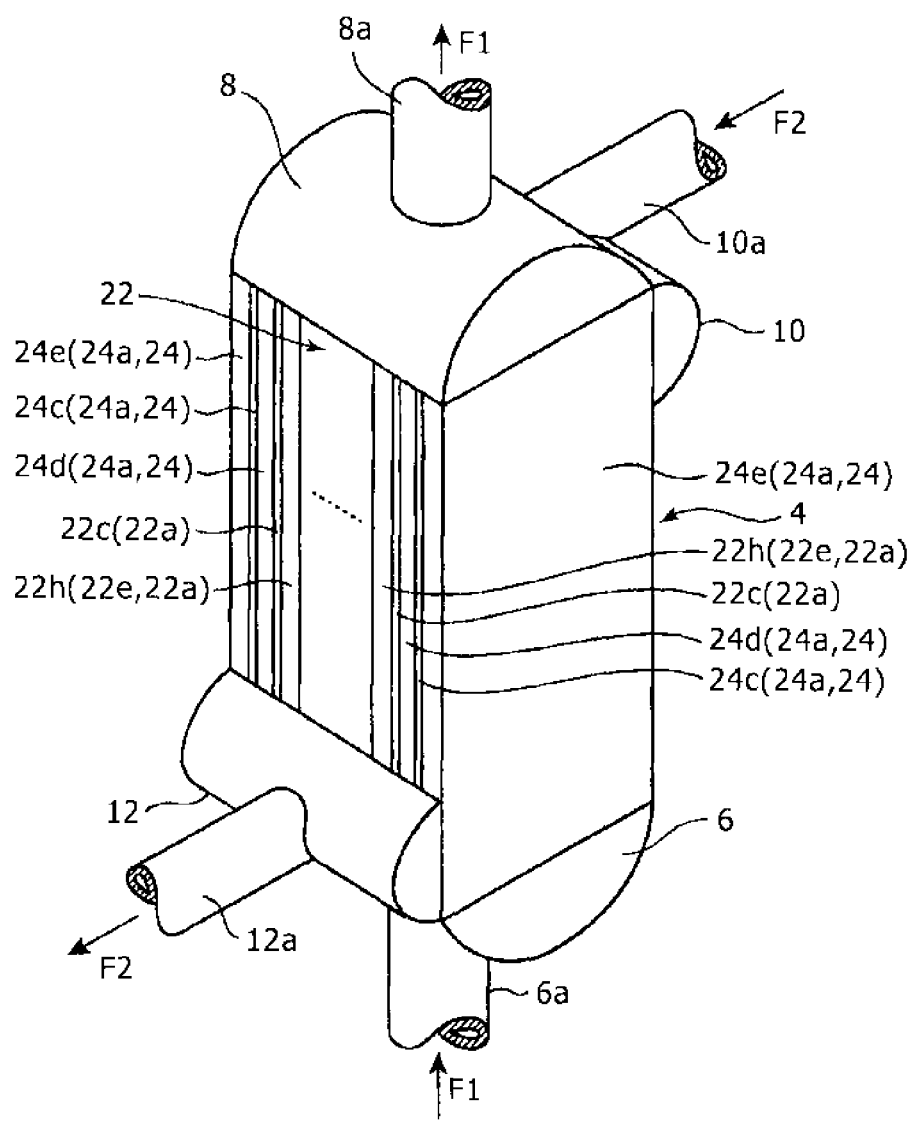
FIG. 1 is a schematic configuration diagram of a plate fin heat exchanger according to one embodiment of the present invention.
Figure 2:
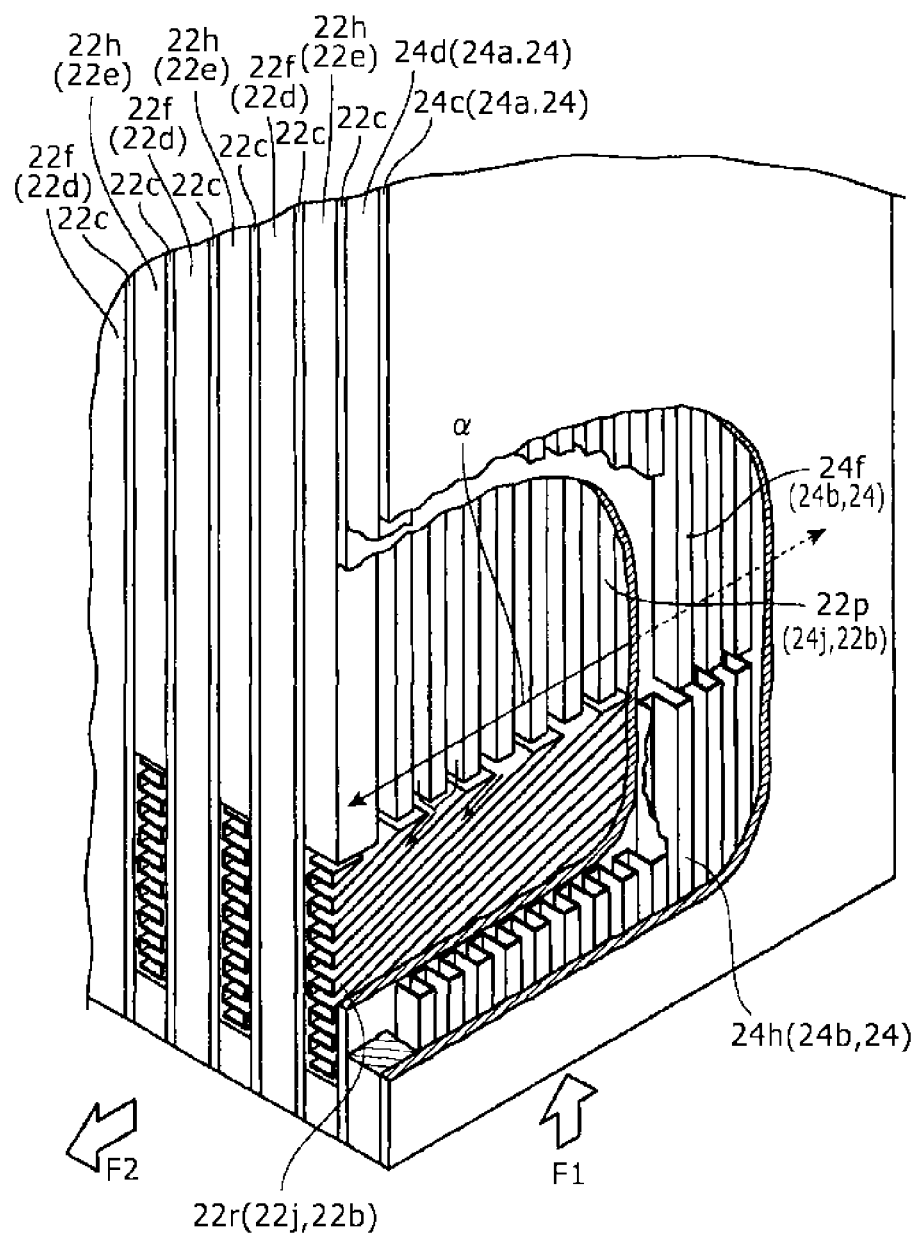
FIG. 2 is a partially enlarged perspective view in which part of a heat exchange unit forming the plate fin heat exchanger is cut out.
Figure 3:
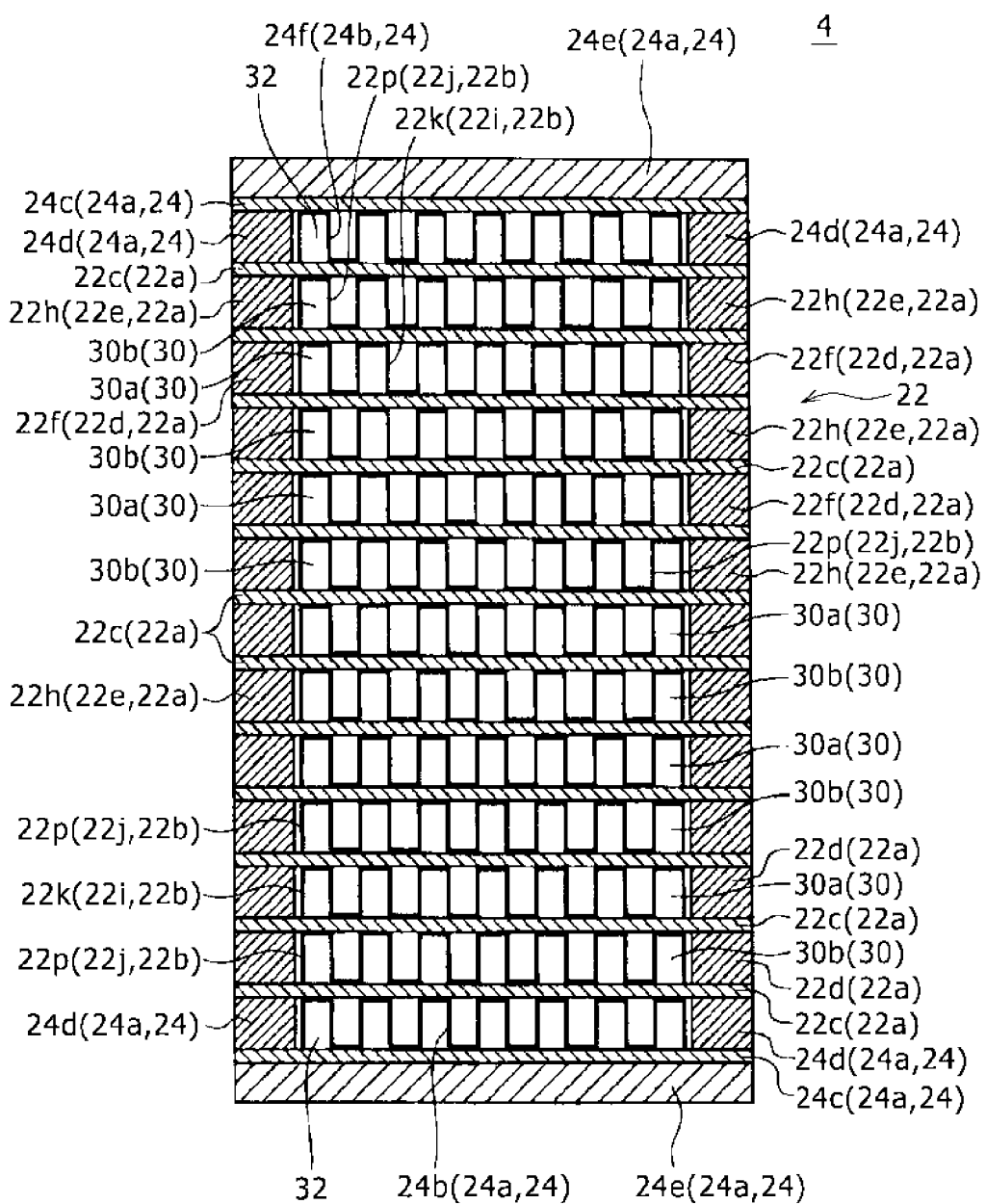
FIG. 3 is a schematic cross-sectional view of the heat exchange unit.
Figure 4:
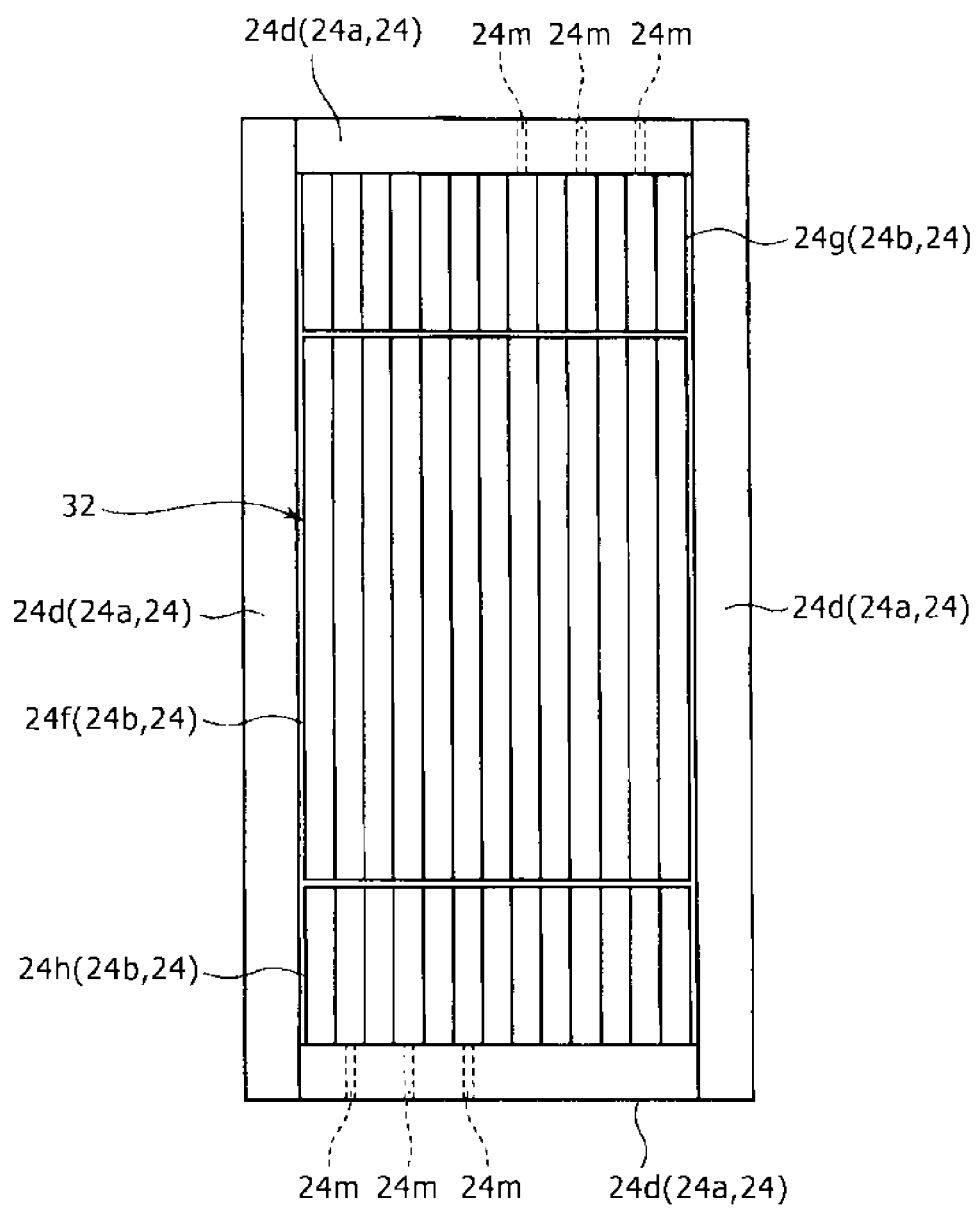
FIG. 4 is a plan view showing a state that an outer plate and a bonding plate are detached from a protection unit forming the plate fin heat exchanger.
Figure 5:
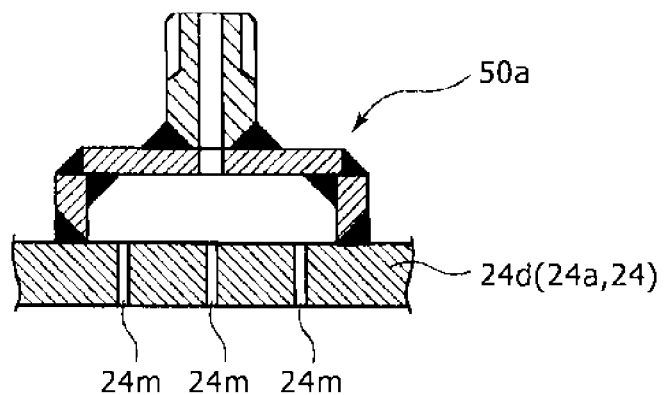
FIG. 5i is a sectional view partially showing one example of release ports and a connection member attached on the outer side of the release ports.

A plate fin heat exchanger 1 according to the present embodiment (hereinafter, also simply referred to as the "heat exchanger 1") is a heat exchanger in which heat exchange is performed between a plurality of fluids flowing inside. Specifically, as shown in FIGS. 1 to 3, the plate fin heat exchanger 1 is provided with a heat exchanger main body 4, a first supply header 6, a first collection header 8, a second supply header 10, and a second collection header 12.

The heat exchanger main body 4 is formed by a heat exchange unit 22 and two protection units 24. In the present embodiment, a material of the heat exchange unit 22 and the protection units 24 is an aluminum alloy.

The heat exchange unit 22 is to perform the heat exchange between the fluids respectively flowing through a number of flow passages 30 (refer to FIG. 3) provided inside. The heat exchange unit 22 has a heat exchange unit main body 22a and a plurality of heat exchange unit fin plates 22h.

In the heat exchange unit main body 22a, a number of flow passages 30 are provided so as to be layered. In the present embodiment, these flow passages 30 are formed by a plurality of first flow passages 30a through which a first fluid F1 flows and a plurality of second flow passages 30b through which a second fluid F2 flows. The first flow passages 30a and the second flow passages 30b are arranged so as to be alternately aligned. The heat exchange unit main body 22a has a plurality of partition plates 22c, a plurality of first enclosing portions 22d, and a plurality of second enclosing portions 22e. It should be noted that the partition plates 22c are included in the concept of the "partition wall" of the present invention.

The partition plate 22c is a rectangular flat plate member capable of transmitting heat between one surface and the other surface in the thickness direction thereof. The plurality of partition plates 22c are aligned at intervals in the same direction as the layering direction of the flow passages 30 in such a manner that a flow passage 30 is formed between the adjacent partition plates 22c. The partition plates 22c are arranged in parallel to each other. The heat exchange is performed between the fluids flowing through the flow passages 30 which sandwich the partition plate 22c on both sides via the partition plate 22c. The partition plate 22c has thickness of about 1.6 mm. It should be noted that a plate having predetermined thickness within a range from 1.0 mm to 3.0 mm can be used as the partition plate 22c. The partition plate 22c has a configuration that thin layers of a brazing filler material are respectively formed on both surfaces of a flat plate shape base material. A material of the base material of the partition plate 22c is an aluminum alloy such as A3003 in the present embodiment. However, the material is not limited to this but may be titanium, copper, stainless steel, or the like.

The plurality of first enclosing portions 22d is to seal both end portions in the width direction of the plurality of first flow passages 30a. The first enclosing portion 22d is arranged between the adjacent partition plates 22c forming the first flow passage 30a. The first enclosing portion 22d is formed by two first side bars 22f. The two first side bars 22f are arranged separately on both ends in the width direction of the pair of partition plates 22c sandwiching the first side bars 22f, and extend in the up and down direction along both edges in the width direction of the pair of partition plates 22c so as to couple the corresponding edges in the width direction of the pair of partition plates 22c. Thereby, the two first side bars 22f close and enclose corresponding end portions in the width direction of the pair of partition plates 22c sandwiching the first side bars. It should be noted that in the present specification, the "width direction" indicates the direction which is parallel to a surface and a back surface of the partition plate 22c and orthogonal to the fluid distribution direction in the first flow passage 30a. The first side bar 22f is bonded to the pair of partition plates 22c sandwiching the first side bar 22f by brazing with using the brazing filler material of the partition plates 22c. A material of the first side bar 22f is an aluminum alloy such as A3003 in the present embodiment. However, the material is not limited to this but may be titanium, copper, stainless steel, or the like. A part between lower end portions of the two first side bars 22f forming the first enclosing portion 22d serves as a first introduction port 30c for introducing the first fluid F1 to the first flow passage 30a. A part between upper end portions of the two first side bars 22f forming the first enclosing portion 22d serves as a first discharge port 30d for discharging the first fluid F1 from the first flow passage 30a. That is, the first introduction port 30c of the first flow passage 30a is opened on a lower end surface of the heat exchanger main body 4 (heat exchange unit 22), and the first discharge port 30d of the first flow passage 30a is opened on an upper end surface of the heat exchanger main body 4 (heat exchange unit 22).

The plurality of second enclosing portions 22e is to seal peripheries of the plurality of second flow passages 30b. The second enclosing portion 22e is arranged between the adjacent partition plates 22c forming the second flow passage 30b. The second enclosing portion 22e is formed by two end bars 22g and two second side bars 22h.

The two end bars 22g are arranged separately on upper and lower ends of the pair of partition plates 22c sandwiching the end bars 22g, and extend in the width direction along upper and lower edges of the pair of partition plates 22c. One of the end bars 22g arranged on the upper ends of the pair of partition plates 22c couples upper end portions of the pair of partition plates 22c and closes and encloses the upper end portions. The other end bar 22g arranged on the lower ends of the pair of partition plates 22c couples lower end portions of the pair of partition plates 22c and closes and encloses the lower end portions. The two second side bars 22h are arranged separately on both the ends in the width direction of the pair of partition plates 22c sandwiching the second side bars 22h, and extend in the up and down direction along both the edges in the width direction of the pair of partition plates 22c so as to couple the corresponding ends in the width direction of the pair of partition plates 22c. It should be noted that one second side bar 22h among the two second side bars 22h is provided so as to range from a position downward away from the upper end bar 22g at a predetermined interval to a position reaching the lower end bar 22g, and the other second side bar 22h is provided so as to range from a position upward away from the lower end bar 22g at a predetermined interval to a position reaching the upper end bar 22g. The end bars 22g and the second side bars 22h forming the second enclosing portion 22e are bonded to the pair of partition plates 22c sandwiching the end bars 22g and the second side bars 22h by brazing with using the brazing filler material of the partition plates 22c. A material of the end bars 22g and the second side bars 22h is the same as the material of the first side bars 22f. A space formed between an upper end of the one second side bar 22h and the upper end bar 22g serves as a second introduction port 30c for introducing the second fluid F2 to the second flow passage 30b. A space formed between a lower end of the other second side bar 22h and the lower end bar 22g serves as a second discharge port 30f for discharging the second fluid F2 from the second flow passage 30. That is, the second introduction port 30e of the second flow passage 30b is opened in the vicinity of an upper end portion on one side surface in the width direction of the heat exchanger main body 4 (heat exchange unit 22), and the second discharge port 30f of the second flow passage 30b is opened in the vicinity of a lower end portion on the other side surface in the width direction of the heat exchanger main body 4 (heat exchange unit 22).

The plurality of heat exchange unit fin plates 22b is provided in order to improve heat exchange efficiency in the heat exchange unit 22. In the present embodiment, the plurality of heat exchange unit fin plates 22b includes a plurality of heat exchange unit first fin plates 22i arranged in the first flow passages 30a and a plurality of heat exchange unit second fin plates 22j arranged in the second flow passages 30b.

The heat exchange unit first fin plate 22i couples the partition plates 22c (adjacent partition plates 22c) facing each other across the first flow passage 30a in which the heat exchange unit first fin plate is arranged. The heat exchange unit first fin plate 22i transmits heat of the first fluid F1 flowing through the first flow passage 30a in which the heat exchange unit first fin plate is arranged respectively to the partition plates 22c facing each other across the first flow passage 30a. That is, the heat exchange unit first fin plate 22i ensures a contact area with the first fluid F1 flowing in the first flow passage 30a in which the heat exchange unit first fin plate is arranged so as to improve the heat exchange efficiency of the heat exchange unit 22. The heat exchange unit first fin plate 22i is formed by a heat exchange unit first center fin plate 22k, a heat exchange unit first supply-side fin plate (not shown), and a heat exchange unit first discharge-side fin plate (not shown).

The heat exchange unit first center fin plate 22k is arranged in a center portion in the first flow passage 30a in the direction in which the first flow passage 30a extends (up and down direction). The heat exchange unit first supply side fin plate (not shown) is arranged on the lower side of the heat exchange unit first center fin plate 22k in the first flow passage 30a. The heat exchange unit first discharge-side fin plate (not shown) is arranged on the upper side of the heat exchange unit first center fin plate 22k in the first flow passage 30a.

The heat exchange unit first center fin plate 22k is a plate member in which concave and convex parts are repeated in the width direction (arrow a direction in FIG. 2) in alternate contact with the pair of partition plates 22c facing each other so as to sandwich the heat exchange unit first center fin plate 22k, in other words, a corrugated plate shape member. The heat exchange unit first supply-side fin plate and the heat exchange unit first discharge-side fin plate are respectively corrugated plate shape members in which concave and convex parts are repeated in the width direction as well as the heat exchange unit first enter fin plate 22k. The repetition numbers of the concave and convex parts of the fin plates forming the heat exchange unit first fin plate 22i are equal to each other. The fin plates are arranged in such a manner that positions of the concave and convex parts match with each other in the width direction and the concave and convex parts extend along the flow direction of the first fluid F1 (up and down direction) in the first flow passage 30a.

The fin plates forming the heat exchange unit first fin plate 22i are respectively formed by processing thin metal plates into a corrugated plate shape. A material of these fin plates is an aluminum alloy such as A3003 in the present embodiment. However, the material is not limited to this but may be titanium, copper, stainless steel, or the like. These fin plates are respectively combined to the pair of partition plates 22c at parts which are in contact with the pair of partition plates 22c sandwiching these fin plates. That is, these fin plates are combined to the partition plates 22c at the plurality of parts placed at intervals in the width direction in which the concave and convex parts are aligned. The fin plates and the partition plates 22c are combined by brazing with using the brazing filler material of the partition plates 22c. Since the fin plates are thinner than the first side bars 22f, the fin plates have smaller heat capacity and are easily thermally deformed.

The fin plates forming the heat exchange unit first fin plate 22i also contribute to a pressure resistance performance of a part of the heat exchange unit 22 constituting the first flow passage 30a. Specifically, these fin plates couple and hold the pair of partition plates 22c sandwiching the fin plates. Thus, even when an inner pressure is applied to the first flow passage 30a between the pair of partition plates 22c, the fin plates prevent the part of the heat exchange unit 22 constituting the first flow passage 30a from bursting, so as to improve the pressure resistance performance of the part. In detail, tensile strength of these fin plates in the layering direction of the flow passages 30 contributes to holding force of the adjacent partition plates 22c forming the first flow passage 30a, and as a result, contributes to the pressure resistance performance of the part of the heat exchange unit 22 constituting the first flow passage 30a. The part of the heat exchange unit 22 constituting the first flow passage 30a is designed to resist against a predetermined inner pressure set as a design pressure. That is, the part of the heat exchange unit 22 constituting the first flow passage 30a has such strength that the part does not burst or is not damaged even when the inner pressure set as the design pressure for the part is applied to the first flow passage 30a.

The heat exchange unit second fin plate 22j couples the partition plates 22c facing each other across the second flow passage 30b in which the heat exchange unit second fin plate is arranged. The heat exchange unit second fin plate 22j transmits heat of the second fluid F2 flowing through the second flow passage 30b in which the heat exchange unit second fin plate is arranged respectively to the partition plates 22c facing each other across the second flow passage 30b. That is, the heat exchange unit second fin plate 22j ensures a contact area with the second fluid F2 flowing in the second flow passage 30b in which the heat exchange unit second fin plate is arranged so as to improve the heat exchange efficiency of the heat exchange unit 22. The heat exchange unit second fin plate 22j is formed by a heat exchange unit second center fin plate 22p, a heat exchange unit second supply-side fin plate (not shown), and a heat exchange unit second discharge-side fin plate 22r.

The heat exchange unit second center fin plate 22p is arranged in a center portion in the second flow passage 30b in the direction in which the second flow passage 30b extends (up and down direction). The heat exchange unit second supply-side fin plate (not shown) is arranged on the upper side of the heat exchange unit second center fin plate 22p in the second flow passage 30b. The heat exchange unit second discharge-side fin plate 22r is arranged on lower side of the heat exchange unit second center fin plate 22p in the second flow passage 30b.

The heat exchange unit second center fin plate 22p is a corrugated plate shape member as well as the heat exchange unit first center fin plate 22k. The heat exchange unit second supply-side fin plate is a corrugated plate shape member in which concave and convex parts are repeated, and is arranged in such a manner that the concave and convex parts obliquely extend toward lower end portions of corresponding concave and convex parts of the heat exchange unit second center fin plate 22p from the second introduction port 30e. The heat exchange unit second discharge-side fin plate 22r is also a corrugated plate shape member in which concave and convex parts are repeated, and is arranged in such a manner that the concave and convex parts obliquely extend toward upper end portions of the corresponding concave and convex parts of the heat exchange unit second center fin plate 22p from the second discharge port 30f. Other configurations of the heat exchange unit second center fin plate 22p, the heat exchange unit second supply-side fin plate, and the heat exchange unit second discharge-side fin plate 22r are the same as the configurations of the heat exchange unit first center fin plate 22k, the heat exchange unit first supply-side fin plate, and the heat exchange unit first discharge side fin plate.

The two protection units 24 are to protect the heat exchange unit 22 from impact and external force applied to the heat exchanger 1 at the time of installation of the heat exchanger 1 or the like. Specifically, the two protection units 24 are arranged separately on both outer sides of the heat exchange unit 22 in the layering direction of the flow passages 30 as shown in FIG. 3. When the impact and the external force are applied, the protection unit 24 is dented and prevents the dent from influencing the inside heat exchange unit 22. The protection unit 24 has a protection unit main body 24a and a protection unit fin plate 24b.

The protection unit main body 24a is attached to the partition plate 22c on the outermost side in the layering direction of the flow passages 30 among the plurality of partition plates 22c of the heat exchange unit 22 (hereinafter, referred to as the outermost-layer partition plate 22c) so as to form an internal space 32 between the protection unit main body and the outermost-layer partition plate 22c. The protection unit main body 24a has a bonding plate 24c, four protection unit side bars 24d, and an outer plate 24.

The bonding plate 24c is a flat plate shape member having the same structure as the partition plate 22c of the heat exchange unit 22. The bonding plate 24c is arranged on the outer side of the outermost-layer partition plate 22c of the heat exchange unit 22 in the layering direction of the flow passages 30 at an interval so as to be parallel to the outermost-layer partition plate 22c.

Two protection unit side bars 24d among the four protection unit side bars 24d of the protection unit 24 are arranged separately on both ends in the width direction of both the plates 22c, 24c between the outermost-layer partition plate 22c of the heat exchange unit 22 and the bonding plate 24c, so as to couple corresponding end portions in the width direction of both the plates 22c, 24c. The two protection unit side bars 24d extend in the up and down direction along edges in the width direction of the bonding plate 24c. The remaining two protection unit side bars 24d are arranged separately on the upper ends and lower ends of both the plates 22c, 24c between the outermost-layer partition plate 22c of the heat exchange unit 22 and the bonding plate 24c, so as to couple the upper ends and the lower ends of both the plates 22c, 24c. The remaining two protection unit side bars 24d extend in the width direction along the upper end and the lower end of the bonding plate 24c. The four protection unit side bars 24d are respectively bonded to the outermost-layer partition plate 22c and the bonding plate 24c by brazing as well as the first side bars 22f and the second side bars 22h of the heat exchange unit 22. Parts between the corresponding end portions in the width direction of the outermost-layer partition plate 22c and the bonding plate 24c, upper end portions, and lower end portions are closed by the protection unit side bars 24d respectively provided between the portions. Thereby, the internal space 32 of the protection unit main body 24a surrounded by both the plates 22c, 24c and the four protection unit side bars 24d is formed between the outermost-layer partition plate 22c and the bonding plate 24c facing the partition plate 22c.

The outer plate 24e is a rectangular flat plate member, which is overlapped on the further outer side of the bonding plate 24c in the layering direction of the flow passages 30, and bonded to the bonding plate 24c in the above state. The outer plate 24e is brazed to the bonding plate 24c with a brazing filler material on the outer surface side of the bonding plate 24c. The outer plate 24e has more thickness than thickness of the partition plate 22c and thickness of the bonding plate 24c. Specifically, the outer plate 24e has thickness of about 5 mm. The same material as the material of the base material of the bonding plate 24c and the partition plate 22c is used as a material of the outer plate 24e.

The protection unit fin plate 24b is arranged in the internal space 32 of the protection unit main body 24a. The protection unit fin plate 24b is formed by a protection unit center fin plate 24f, a protection unit upper fin plate 24g, and a protection unit lower fin plate 24h.

The protection unit center fin plate 24f is arranged in a center portion in the up and down direction in the internal space 32 of the protection unit main body 24a. The protection unit upper fin plate 24g is arranged on the upper side of the protection unit center fin plate 24f in the internal space 32. The protection unit lower fin plate 24h is arranged on the lower side of the protection unit center fin plate 24f in the internal space 32.

A configuration of the protection unit center fin plate 24f is the same as the configuration of the heat exchange unit first center fin plate 22k in the first flow passage 30a. The protection unit upper fin plate 24g is a corrugated plate shape member in which concave and convex parts are repeated, and is arranged in such a manner that the concave and convex parts extend toward an upper end of the protection unit center fin plate 24f from a lower surface of the upper protection unit side bar 24d. The protection unit lower fin plate 24h is also a corrugated plate shape member in which concave and convex parts are repeated, and is arranged in such a manner that the concave and convex parts extend toward a lower end of the protection unit center fin plate 24f from an upper surface of the lower protection unit side bar 24d. Other configurations of the protection unit upper fin plate 24g are the same as the configuration of the heat exchange unit first discharge-side fin plate, and other configurations of the protection unit lower fin plate 24h are the same as the configuration of the heat exchange unit first supply-side fin plate. The protection unit center fin plate 24f, the protection unit upper fin plate 24g, and the protection unit lower fin plate 24h are combined to the plates 22c, 24c at parts which are in contact with the outermost-layer partition plate 22c and the bonding plate 24c sandwiching the fin plates. That is, the fin plates 24f, 24g, 24h are combined to the outermost-layer partition plate 22c and the bonding plate 24c at the plurality of parts placed at intervals in the width direction. The fin plates and the plates are combined by brazing with using the brazing filler material of the outermost-layer partition plate 22c and brazing with using the brazing filler material of the bonding plate 24c.

The protection unit fin plate 24h gives rigidity against the impact and the external force to the protection unit 24. Specifically, when the impact and the external force are applied to the outer plate 24e from the outer side to the inner side in the layering direction of the flow passages 30, the protection unit fin plate 24b supports the bonding plate 24c and the outer plate 24e in the internal space 32, so as to reduce dents of the bonding plate 24c and the outer plate 24e and prevent the dents from influencing the heat exchange unit 22.

The protection unit fin plate 24b gives the pressure resistance performance to the protection unit 24. Specifically, the protection unit fin plate 24b couples and holds the outermost-layer partition plate 22c of the heat exchange unit 22 and the bonding plate 24c sandwiching the protection unit fin plate. Thus, even when an inner pressure is applied to the internal space 32 between the outermost-layer partition plate 22c and the bonding plate 24c, the protection unit fin plate prevents the protection unit main body 24a from bursting, so as to give the pressure resistance performance to the protection unit 24.

In detail, the protection unit fin plate 24b (the protection unit center fin plate 24f, the protection unit upper fin plate 24g, and the protection unit lower fin plate 24h) of the protection unit 24 has such strength that a coupling state between the outermost-layer partition plate 22c and the bonding plate 24c is maintained even in a case where an inner pressure set as a design pressure for a part of the heat exchange unit 22 constituting the outermost-layer flow passage 30 adjacent to the protection unit 24 is applied to the internal space 32 of the protection unit main body 24a of the protection unit 24.

Specifically, the protection unit fin plate 24b of the protection unit 24 has pressure-resistance strength which is not less than pressure-resistance strength of the heat exchange unit fin plate 22b arranged in the outermost-layer flow passage 30 adjacent to the protection unit 24. The pressure-resistance strength of a fin plate is indicated by an inner pressure applied to a space (flow passage) in which the fin plate is arranged, the maximum inner pressure with which the fin plate is not broken. Tensile strength of the protection unit fin plate 24b in the layering direction of the flow passages 30 is set to be such strength that the protection unit fin plate 24b does not burst or is not damaged even in a case where the inner pressure set as the design pressure is applied to the internal space 32 of the protection unit main body 24a. In the present embodiment, as the tensile strength in the layering direction of the flow passages 30, the protection unit fin plate 24h of the protection unit 24 has strength which is not less than the tensile strength in the same direction of the heat exchange unit fin plate 22b arranged in the outermost-layer flow passage 30 adjacent to the protection unit 24.

The pressure-resistance strength and the tensile strength of the protection unit fin plate 24b are varied by thickness and a material of a thin plate forming the protection unit fin plate 24b, an arrangement interval of a plurality of fins of the protection unit fin plate 24b (parts extending in the layering direction of the flow passages 30, in other words, extending substantially perpendicularly to the outermost-layer partition plate 22c and the bonding plate 24c), or the like. That is, with more thickness of the thin plate used for forming the protection unit fin plate 24b than thickness of a thin plate used for forming the heat exchange unit fin plate 22b which is arranged in the outermost-layer flow passage 30, the pressure-resistance strength and the tensile strength of the protection unit fin plate 24b may be made greater than the pressure-resistance strength and the tensile strength of the heat exchange unit fin plate 22b which is arranged in the outermost-layer flow passage 30. With a material of the protection unit fin plate 24b having higher strength than a material of the heat exchange unit fin plate 22b, the pressure-resistance strength and the tensile strength of the protection unit fin plate 24b may be made greater than the pressure-resistance strength and the tensile strength of the heat exchange unit fin plate 22b which is arranged in the outermost-layer flow passage 30. With a closer arrangement interval of the plurality of fins of the protection unit fin plate 24b than an arrangement interval of a plurality of fins of the heat exchange unit fin plate 22b, the pressure-resistance strength and the tensile strength of the protection unit fin plate 24b may be made greater than the pressure-resistance strength and the tensile strength of the heat exchange unit fin plate 22b which is arranged in the outermost-layer flow passage 30.

The protection unit fin plate 24b of the protection unit 24 and an outer surface of the outermost-layer partition plate 22c are bonded with such bonding strength that a bonding state between the protection unit fin plate 24b and the outer surface of the outermost-layer partition plate 22c is maintained even in a case where the inner pressure set as the design pressure for the part of the heat exchange unit 22 constituting the outermost-layer flow passage 30 adjacent to the protection unit 24 is applied to the internal space 32 of the protection unit main body 24a of the protection unit 24. The protection unit fin plate 24b of the protection unit 24 and an inner surface of the bonding plate 24c facing the outer surface of the outermost-layer partition plate 22c are bonded with such bonding strength that a bonding state between the protection unit fin plate 24b and the inner surface of the bonding plate 24c is maintained even in a case where the inner pressure set as the design pressure for the part of the heat exchange unit 22 constituting the outermost-layer flow passage 30 adjacent to the protection unit 24 is applied to the internal space 32 of the protection unit main body 24a of the protection unit 24.

With the above configuration of the protection unit fin plate 24b, the pressure resistance performance is given to the protection unit 24. It should be noted that in order to prevent an increase in a type of members, the protection unit fin plate 24b1 may be a fin plate with the same configuration as the heat exchange unit fin plate 22b arranged in the outermost-layer flow passage 30.

A plurality of release ports 24m (refer to FIG. 4) for, in a case where the fluid flows into the internal space 32 from the outermost-layer flow passage 30, releasing the fluid to an exterior is provided in the protection unit main body 24a of the protection unit 24. The release ports 24m are included in the concept of the "release portion" of the present invention. The release ports 24m are formed in the protection unit main body 24a so as to make the internal space 32 of the protection unit main body 24a open to the atmosphere. In the present embodiment, the release ports 24m are through holes formed in the protection unit side bars 24d of the protection unit 24 so as to provide communication between the internal space 32 of the protection unit main body 24a and an external space of the heat exchanger 1. In the present embodiment, the release ports 24m are respectively formed in the protection unit side bar 24d arranged in one end portion of the protection unit main body 24a in the direction in which the flow passage 30 of the heat exchange unit 22 extends, and the protection unit side bar 24d arranged in the other end portion.

A pressure resistance test already confirms that the protection unit 24 having the configuration as described above has such a pressure resistance performance that the protection unit is not broken even when the inner pressure set as the design pressure for the part of the heat exchange unit 22 constituting the outermost-layer flow passage 30 adjacent to the protection unit 24 is applied to the internal space 32 of the protection unit main body 24a of the protection unit 24.

Figure 6:
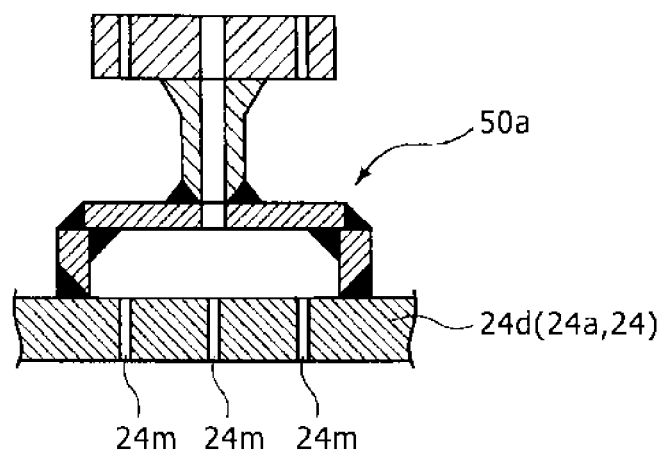
FIG. 6 is a sectional view partially showing another example of the release ports and the connection member attached on the outer side of the release ports.
Figure 7:
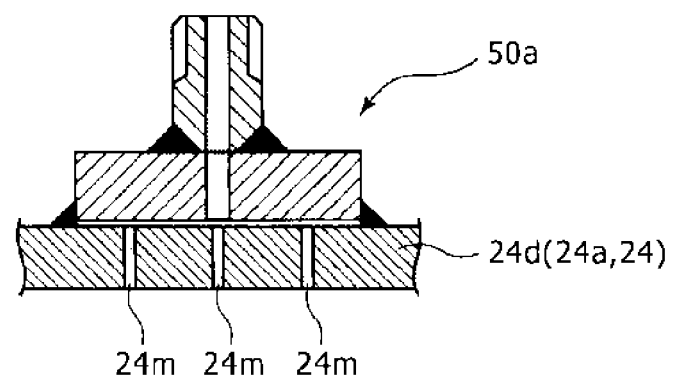
FIG. 7 is a sectional view partially showing still another example of the release ports and the connection member attached on the outer side of the release ports.
Figure 8:
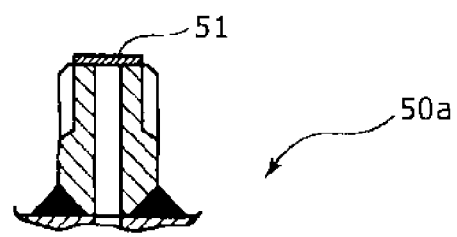
FIG. 8 is a partially sectional view showing a state that a sealing material is attached to the connection member provided with a threaded connection portion.
Figure 9:
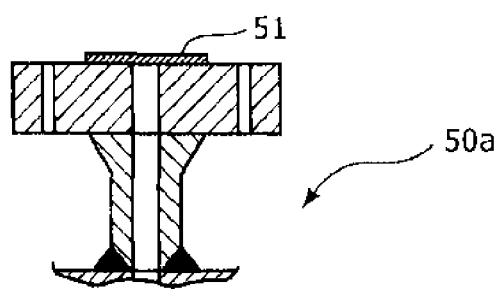
FIG. 9 is a partially sectional view showing a state that the scaling material is attached to the connection member provided with a flanged connection portion.

Specifically, in this pressure resistance test, a connection member 50a (refer to FIG. 5) is attached onto an outer surface of the protection unit side bar 24d in which the release ports 24m are formed so as to cover the release ports 24m, a pipe (not shown) is connected to the connection member 50a, and a fluid (a gas or a liquid) for a pressure test is introduced from this pipe into the internal space 32 of the protection unit main body 24a through the connection member 50a and the release port 24m. The connection member 50a has for example a bowl shape part formed so as to cover all the plurality of release ports 24m which is formed in one protection unit side bar 24d, and a threaded connection portion attached on the outer side of the part and connected to the pipe. It should be noted that the connection member 50a is not limited to such a connection member but the threaded connection portion of FIG. 5 may be replaced with a flanged connection portion as shown in FIG. 6, the bowl shape part may be replaced with a plate body in which a through hole is formed as shown in FIG. 7, or various other modes may be used.

After the liquid is introduced into the internal space 32 of the protection unit main body 24a, the release ports 24m other than the release port 24m from which the liquid is introduced are closed. While confirming a supply pressure of the fluid, that is, a pressure applied to the internal space 32 of the protection unit main body 24a by a pressure gauge on the supply side of the fluid, the pressure is boosted until the pressure reaches a set pressure of the pressure resistance test. This set pressure of the pressure resistance test is a pressure which is not less than the inner pressure set as the design pressure. In order to enhance safety, the set pressure is set to be for example a pressure which is about 1.3 to 1.5 times more than the inner pressure set as the design pressure.

Figure 10:
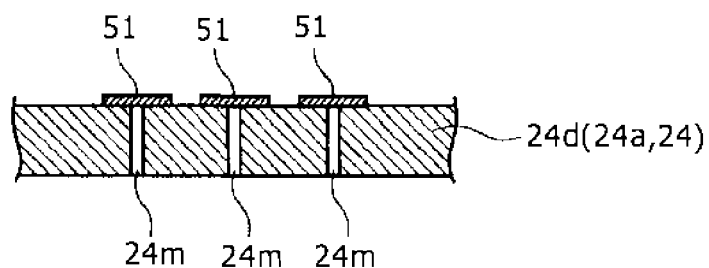
FIG. 10 is a partially sectional view showing a state that the sealing materials are attached to a protection unit side bar so as to directly close the release ports.

When the pressure applied to the internal space 32 reaches the set pressure, by retaining the pressure for a fixed time, it is confirmed that the protection unit 24 has such a pressure resistance performance that the protection unit can resist against the set pressure. After that, the pressure is released, and in a case where the liquid is used as the fluid for the pressure test, an interior of the protection unit main body 24a is dried. Finally, all the release ports 24m are sealed. For example, in a case where the connection member 50a provided with the threaded connection portion is used (refer to FIG. 8) or in a case where the connection member 50a provided with the flanged connection portion is used (refer to FIG. 9), the release ports 24m may be sealed by closing a hole of the connection member 50a through which the fluid passes with a sealing material 51 such as an aluminum tape. The release ports 24m may also be sealed by cutting the threaded connection portion or the flanged connection portion in the middle and the attaching the sealing material such as an aluminum tape onto the cut surface so as to close the hole of the connection member 50a through which the fluid passes. As shown in FIG. 10, the release ports 24m may also be sealed by cutting the entire connection member 50a so as to expose an outer surface of a part of the protection unit side bar 24d where the release ports 24m are formed, and attaching the sealing materials 51 such as an aluminum tape to the outer surface so as to close the release ports 24m. It should be noted that when the fluid flowing into the internal space 32 of the protection unit main body 24a is expanded, the pressure of the internal space 32 is increased, and the inner pressure of the internal space 32 exceeds a predetermined pressure, the sealing material 51 may be attached with such attachment force that the sealing material is detached by the pressure so as to open the release ports 24m. It should be noted that the predetermined pressure is a small pressure in comparison to the design pressure, and the attachment force of the sealing material 51 is such small attachment force that the sealing material 51 is detached by such small pressure.

The first supply header 6 (refer to FIG. 1) is attached to the lower end surface of the heat exchanger main body 4 in such a manner that an internal space thereof communicates with the first introduction port 30c of the first flow passage 30a. A first supply pipe 6a for supplying the first fluid F1 is connected to the first supply header 6.

The first collection header 8 is attached to the upper end surface of the heat exchanger main body 4 in such a manner that an internal space thereof communicates with the first discharge port 30d of the first flow passage 30a. A first discharge pipe 8a for discharging the first fluid F1 from the heat exchanger 1 is connected to the first collection header 8.

The second supply header 10 is attached to one side surface in the width direction in an upper part of the heat exchanger main body 4 in such a manner that an internal space thereof communicates with the second introduction port 30e of the second flow passage 30b. A second supply pipe 10a for supplying the second fluid F2 is connected to the second supply header 10.

The second collection header 12 is attached to a side surface on the opposite side of the one side surface in the width direction in a lower part of the heat exchanger main body 4 in such a manner that an internal space thereof communicates with the second discharge port 30f of the second flow passage 30b. A second discharge pipe 12a for discharging the second fluid F2 from the heat exchanger 1 is connected to the second collection header 12. It should be noted that the internal spaces of the headers 6, 8, 10, 12 do not communicate with the internal space 32 of the protection unit main body 24a.

In the heat exchanger 1 of the present embodiment formed as above, for example the relatively high-temperature first fluid F1 passes from the first supply pipe 6a to the first supply header 6 and the first introduction port 30c in this order and is introduced into the first flow passage 30a, while for example the highly low-temperature second fluid F2 passes from the second supply pipe 10a to the second supply header 10 and the second introduction port 30e in this order and is introduced into the second flow passage 30b. Thereby, while the first fluid F1 and the second fluid F2 flow oppositely (the first fluid F1 flows upward and the second fluid F2 flows downward in FIG. 1) in the heat exchange unit 22, the heat exchange is performed between the first fluid F1 in the first flow passage 30a and the second fluid F2 in the adjacent second flow passage 30b via the partition plate 22c. The first fluid F1 flowing through the first flow passage 30a is discharged from the first flow passage 30a through the first discharge port 30d, then collected in the first collection header 8, and discharged to the exterior through the first discharge pipe 8a. The second fluid F2 flowing through the second flow passage 30b is discharged from the second flow passage 30b through the second discharge port 30f, then collected in the second collection header 12, and discharged to the exterior through the second discharge pipe 12a.

During the heat exchange in the heat exchanger 1, a radical temperature change may sometimes be generated in the fluid flowing through the flow passage 30 of the heat exchange unit 22. In this case, the partition plate 22c and the heat exchange unit fin plate 22b which are thin members are quickly expanded or contracted. However, since the side bars 22f which are thick members have large heat capacity, the side bars are expanded or contracted later than the partition plate 22c and the heat exchange unit fin plate 22b. For example, in a case where a high-temperature fluid abruptly flows through the flow passage 30, the partition plate 22c and the heat exchange unit fin plate 22b are held by the side bars 22f, 22h and hence not easily expanded in the vicinity of the side bars 22f, 22h but greatly expanded in the vicinity of center in the width direction of the flow passage 30. As a result, in the vicinity of the center in the width direction of the flow passage 30, a gap between the adjacent partition plates 22c is extended more than vicinities of both ends in the width direction. Meanwhile, in a case where a low-temperature fluid abruptly flows through the flow passage 30, the partition plate 22c and the heat exchange unit fin plate 22b are greatly contracted in the vicinity of the center in the width direction of the flow passage 30, and the gap between the adjacent partition plates 22c is narrowed in comparison to the vicinities of both the ends in the width direction.

In a case where the heat exchanger 1 is used for an unstable operation, supply of the fluid to the heat exchanger 1 and stop of the supply are repeatedly performed. In this case, the same thermal deformation as above is also repeatedly generated in the heat exchange unit 22.

In the heat exchange unit 22, a number of flow passages 30 are layered. Thus, from a center portion toward the outer side in the layering direction of the flow passages 30 (toward the upper side and the lower side in FIG. 3), deformation amounts of the partition plates 22c in layers are added up, so that a deformation amount of the partition plate 22c from an initial state is increased. In a case where the heat exchanger 1 is used for an unstable operation, the above thermal deformation is repeatedly generated. Thus, metal fatigue due to the above deformation is accumulated in the partition plate 22c, and this metal fatigue is accumulated most in the outermost-layer partition plate 22c whose deformation amount is the largest. As a result, a possibility that damage such as breaking or cracking is generated in the outermost-layer partition plate 22c is high. Particularly, since large bending deformation is generated in parts of the outermost-layer partition plate 22c in the vicinity of the side bars 22f, 22h in comparison to other parts, damage is easily generated. In a case where damage such as breaking or cracking is generated in the outermost-layer partition plate 22c, the fluid flows into the internal space 32 of the protection unit main body 24a from the outermost-layer flow passage 30 through the damaged parts. This fluid flowing into the internal space 32 of the protection unit main body 24a can be emitted to the exterior through the release ports 24m. For example, even in a case where a low-temperature liquefied gas flows into the internal space 32 of the protection unit main body 24a from the outermost-layer flow passage 30, then the heat exchanger 1 is heated, and the liquefied gas is gasified and abruptly expanded, the sealing material 51 closing the release ports 24m is pushed away by a pressure of the gas and the release ports 24m are opened. Thus, the gas is emitted from the internal space 32 of the protection unit main body 24a to the exterior through the release ports 24m. As a result, burst or damage of the protection unit main body 24a is avoided.

However, in this state, the fluid flowing through the outermost-layer flow passage 30 always flows into the internal space 32 of the protection unit main body 24a through the damaged parts of the outermost-layer partition plate 22c, and flows out from the internal space 32 to the exterior through the release ports 24m. Therefore, in order to continuously use the heat exchanger 1, there is a need for repairing the heat exchanger 1 for stopping the fluid from flowing out from the internal space 32 of the protection unit main body 24a to the exterior. It should be noted that a state that the outermost-layer partition plate 22c is damaged and the fluid flows out from the internal space 32 of the protection unit main body 24a to the exterior through the release ports 24m can be detected by for example a gas detector. In a case where the fluid has a highly low temperature, ice coating is generated on an outer surface of the heat exchanger main body 4. Thus, the above state can also be detected by the ice coating.

Next, a repair method for the heat exchanger 1 will be described.

Firstly, the supply of the fluid to the flow passage 30 of the heat exchange unit 22 is stopped. The release ports 24m from which the fluid flows out are sealed (sealing step). In the present embodiment, the release ports 24m are sealed by welding.

Figure 11:
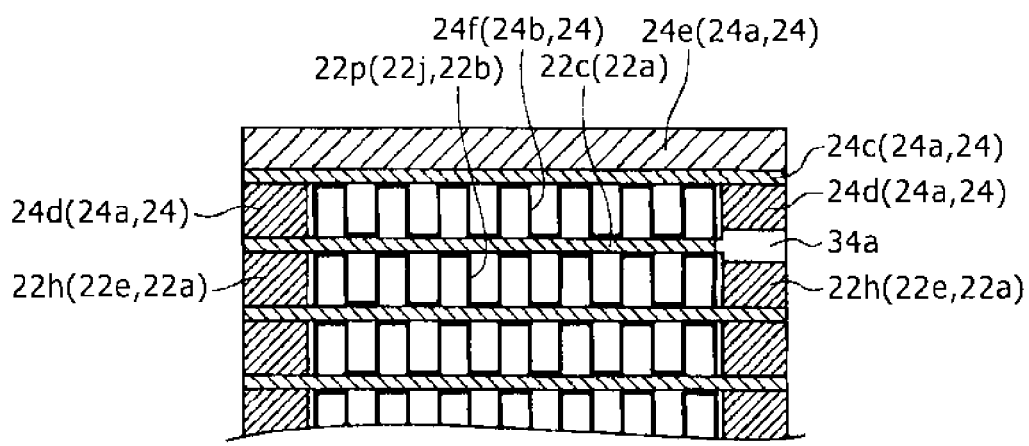
FIG. 11 is a view for illustrating a step of forming a hole from a side surface of a heat exchanger main body in the width direction of a flow passage in an opening formation step at the time of repairing the plate fin heat exchanger.
Figure 12:
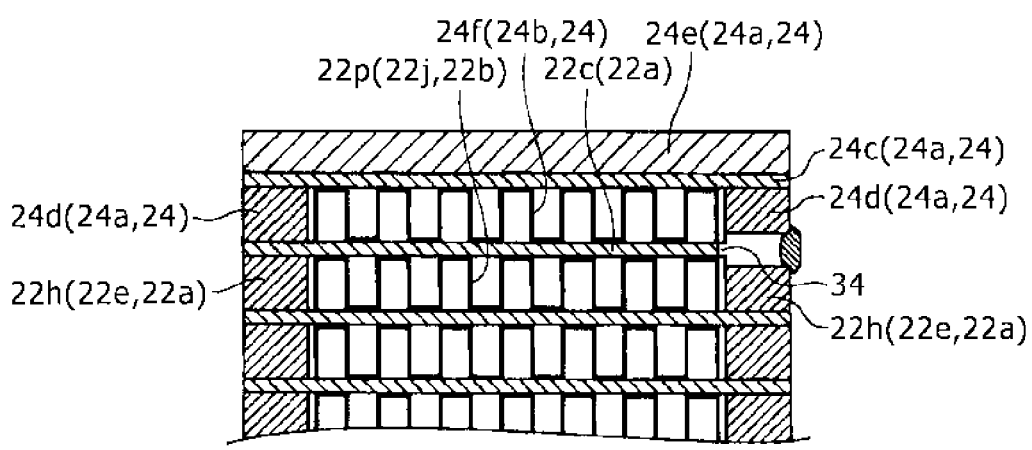
FIG. 12 is a view showing a state that the hole shown in FIG. 11 is sealed from the outside and an opening providing communication between the outermost-layer flow passage and an internal space of a protection unit main body is formed.

Further, in the repair method, an opening 34 (refer to FIG. 12) is formed on the outermost-layer partition plate 22c on the side of the protection unit 24 where the closed release ports 24m are formed (opening formation step). In this opening formation step, firstly, a hole 34a (refer to FIG. 11) is formed on the heat exchanger main body 4 by a drill. At this time, the hole 34a ranges over the outermost-layer partition plate 22c on the side of the protection unit 24 where the sealed release ports 24m are formed and the protection unit side bar 24d and the second side bar 22h sandwiching the partition plate 22c in the heat exchange main body 4, and the hole 34a is formed so as to pass through the side bars 24d, 22h from the outer side of the partition plate 22c and the side bars 24d, 22h toward the inner side in the width direction of the flow passage 30. By welding and sealing a part of this hole 34a opened on the outer side of the heat exchanger main body 4, the opening 34 providing communication between the outermost-layer flow passage 30 and the internal space 32 of the protection unit main body 24a inside the heat exchanger main body 4 is formed. It should be noted that the opening 34 has a section area which is the same as or more than a section area of a flow passage in a supply pipe (the second supply pipe 10a in the present embodiment) connected to the outermost-layer flow passage 30.

In the heat exchanger 1 repaired in such a way, even when the fluid supplied to the outermost-layer flow passage 30 flows out to the internal space 32 of the protection unit main body 24a, due to the sealed release ports 24m provided in the protection unit main body 24a, the fluid is prevented from flowing out from the internal space 32 of the protection unit main body 24a to the exterior. In this repaired heat exchanger 1, the opening 34 providing communication between the outermost-layer flow passage 30 and the internal space 32 of the protection unit main body 24a is formed. Thus, fluid distribution between the outermost-layer flow passage 30 and the internal space 32 of the protection unit main body 24a is smoothened.

In the present embodiment, the protection unit fin plate 24b of the protection unit 24 has such strength that the coupling state between the outermost-layer partition plate 22c and the bonding plate 24c is maintained even in a case where the inner pressure set as the design pressure for the part of the heat exchange unit 22 constituting the outermost-layer flow passage 30 adjacent to the protection unit 24 is applied to the internal space 32 of the protection unit main body 24a of the protection unit 24. Therefore, even when the inner pressure corresponding to the design pressure is applied to the internal space 32 of the protection unit main body 24a of the protection unit 24, the strength resistant against the inner pressure can be given to the protection unit 24. That is, even when the fluid flowing through the outermost-layer flow passage 30 of the heat exchange unit 22 flows into the internal space 32 of the protection unit 24, the protection unit 24 has strength resistant against the pressure of the fluid. Thus, the internal space 32 of the protection unit 24 can be used as part of the outermost-layer flow passage 30 adjacent to the protection unit 24. Therefore, after the outermost-layer partition plate 22c is damaged in the heat exchanger 1 and the fluid flows into the internal space 32 of the protection unit 24 from the outermost-layer flow passage 30, only by sealing the release ports 24m of the protection unit 24, the heat exchanger 1 can be brought into a state that the heat exchanger has a sufficient pressure resistance performance while preventing the fluid from flowing out from the heat exchanger 1 to the exterior. Accordingly, in the present embodiment, the heat exchanger 1 can be restored into a state that no fluid flows out to the exterior and the heat exchanger has a sufficient pressure resistance performance for a short time in comparison to the conventional plate fin heat exchanger requiring repair tasks of detaching the header for supplying the fluid by cutting the welded part, sealing the inlet of the outermost-layer flow passage, and welding the header for supplying the fluid again. It should be noted that the opening 34 for providing communication between the internal space 32 of the protection unit main body 24a and the outermost-layer flow passage 30 adjacent to the internal space 32 is formed upon the repair of the heat exchanger 1 in the present embodiment. However, even when a time required for forming this opening 34 is added, the heat exchanger 1 can be restored for a short time in comparison to the repair tasks of the conventional plate fin heat exchanger.

In the present embodiment, the protection unit fin plate 24b of the protection unit 24 and the outer surface of the outermost-layer partition plate 22c are bonded with such bonding strength that the bonding state between the protection unit fin plate 24h and the outer surface of the outermost-layer partition plate 22c is maintained even in a case where the inner pressure set as the design pressure for the part of the heat exchange unit 22 constituting the outermost-layer flow passage 30 adjacent to the protection unit 24 is applied to the internal space 32 of the protection unit main body 24a of the protection unit 24, and the protection unit fin plate 24b of the protection unit 24 and the inner surface of the bonding plate 24c facing the outer surface of the outermost-layer partition plate 22c are bonded with such bonding strength that the bonding state between the protection unit fin plate 24b and the inner surface of the bonding plate 24c is maintained even in a case where the inner pressure set as the design pressure is applied to the internal space 32 of the protection unit main body 24a of the protection unit 24. Therefore, sufficient bonding strength is respectively given to a bonding portion between the protection unit fin plate 24b and the outer surface of the outermost-layer partition plate 22c and a bonding portion between the protection unit fin plate 24b and the inner surface of the bonding plate 24c, so that the coupling state of the protection unit fin plate 24b with the outer surface of the outermost-layer partition plate 22c and the inner surface of the bonding plate 24c can be more reliably maintained.

In the present embodiment, the tensile strength of the protection unit fin plate 24b of the protection unit 24 in the layering direction of the flow passages 30 is strength which is not less than the tensile strength in the same direction of the heat exchange unit fin plate 22b arranged in the outermost-layer flow passage 30 adjacent to the protection unit 24. Thus, the protection unit 24 has a pressure resistance performance which is not less than the pressure resistance performance of the part of the heat exchange unit 22 constituting the outermost-layer flow passage 30 adjacent to the protection unit 24. Therefore, the pressure resistance performance of the protection unit 24 is a pressure resistance performance with sufficiently extra room for resisting against the inner pressure set as the design pressure for the part of the heat exchange unit 22 constituting the outermost-layer flow passage 30 adjacent to the protection unit 24. Accordingly, in a case where the outermost-layer partition plate 22c of the heat exchange unit 22 is damaged and even in a case where the release ports 24m of the protection unit 24 adjacent to the outermost-layer partition plate 22c are sealed and the internal space 32 of the protection unit 24 is utilized as part of the outermost-layer flow passage 30 of the heat exchange unit 22, the heat exchanger 1 in which the protection unit 24 exerts a sufficiently safe pressure resistance performance can be formed.

In the present embodiment, the pressure resistance test already confirms that the protection unit 24 has such a pressure resistance performance that the protection unit is not broken even when the inner pressure set as the design pressure for the part of the heat exchange unit 22 constituting the outermost-layer flow passage 30 adjacent to the protection unit 24 is applied to the internal space 32 of the protection unit 24. In the conventional plate fin heat exchanger, it is not supposed that in a case where the outermost-layer partition wall is damaged, repair of sealing the release ports is performed so as to utilize the internal space of the protection unit as part of the outermost-layer flow passage, and hence the pressure resistance performance of the protection unit is not confirmed by a test of an actual product. Meanwhile, in the present embodiment, the pressure resistance performance of the protection unit 24 is already confirmed as above. Thus, in a case where the release ports 24m of the protection unit 24 are sealed after the outermost-layer partition plate 22c is damaged, the internal space 32 of the protection unit 24 can be utilized as part of the outermost-layer flow passage 30 adjacent to the protection unit 24 at ease.

In the present embodiment, since the release ports 24m are sealed by the scaling material 51 in a state that the fluid does not flow into the internal space 32 of the protection unit main body 24a, foreign substances, rainwater, and the like can be prevented from invading the internal space 32 of the protection unit main body 24a through the release ports 24m. In addition, in a case where the fluid flows into the internal space 32 of the protection unit main body 24a from the outermost-layer flow passage 30 and the inner pressure of the internal space 32 of the protection unit main body 24a is increased, the release ports 24m can be opened so as to release the fluid from the internal space 32 to the exterior.

It should be noted that the embodiment disclosed herein is thought to be not restriction but only an example in all aspects. The scope of the present invention is indicated not by the above description of the embodiment but by the claims, and further includes equivalent meanings to the claims and all modifications within the scope.

For example, in the above embodiment, one layer of protection unit 24 is provided on the outermost-layer partition plate 22c of the heat exchange unit 22. However, two layers of protection units may be provided on the outermost-layer partition plate 22c. Both the two layers of protection units are preferably formed as the same as the one layer of protection unit 24 of the above embodiment so as to have a pressure resistance performance.

The protection unit fin plate 24b of the protection unit 24 may have at least such strength that the coupling state between the outermost-layer partition plate 22c and the bonding plate 24c of the protection unit main body 24a facing the partition plate 22c is maintained even in a case where the inner pressure set as the design pressure for the part of the heat exchange unit 22 constituting the outermost-layer flow passage 30 adjacent to the protection unit 24 is applied to the internal space 32 of the protection unit main body 24a of the protection unit 24. That is, the pressure-resistance strength of the protection unit fin plate 24b of the protection unit 24 and the tensile strength of the protection unit fin plate 24b of the protection unit 24 in the layering direction of the flow passages 30 are not necessarily not less than the pressure-resistance strength of the heat exchange unit fin plate 22b arranged in the outermost-layer flow passage 30 adjacent to the protection unit 24 and the tensile strength in the layering direction of the flow passages 30. Specifically, the pressure-resistance strength and the tensile strength of the protection unit fin plate 24b of the protection unit 24 may be pressure-resistance strength and tensile strength resistant against the inner pressure set as the design pressure for the part constituting the outermost-layer flow passage 30 adjacent to the protection unit 24 and may be smaller than the pressure-resistance strength and the tensile strength of the heat exchange unit fin plate 22b arranged in the outermost-layer flow passage 30 adjacent to the protection unit 24.

In the above embodiment, the heat exchanger in which the heat exchange is performed between two types of fluids F1, F2 is described as an example. However, the present invention can be applied to a heat exchanger in which heat exchange is performed between three or more types of fluids.

Figure 13:
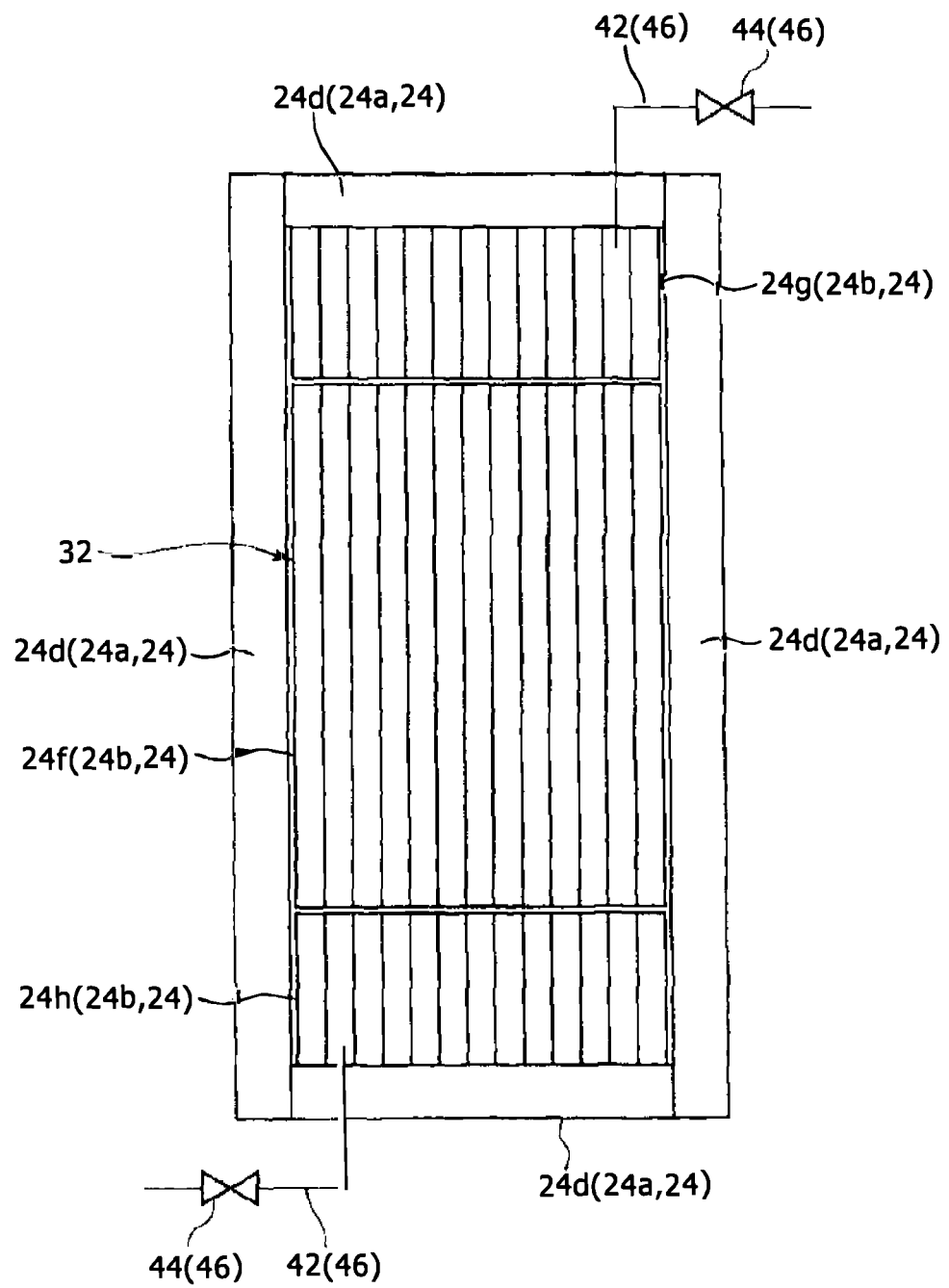
FIG. 13 is a plan view of a protection unit forming a plate fin heat exchanger according to one modified example of the present invention, the view corresponding to FIG. 4.

The release portion of the present invention is not limited to the release ports 24m sealed by the sealing material 51 as shown in the above embodiment. For example, as shown in FIG. 13, a release portion 46 may be formed by a discharge pipe 42 connected to the internal space 32 of the protection unit main body 24a and a safety valve 44 provided in the discharge pipe 42. With this configuration, when the fluid flows into the internal space 32 of the protection unit main body 24a, the heat exchanger 1 is heated, this fluid is expanded, and the inner pressure of the internal space 32 of the protection unit main body 24a becomes not less than a fixed pressure, the fluid can be released from the internal space 32 of the protection unit main body 24a to the exterior through the discharge pipe 42 and the safety valve 46.

The release ports 24m are not necessarily scaled by the sealing material 51 but may be always open to the atmosphere. The release ports may be respectively formed on the pair of protection unit side bars 24d facing each other in the width direction. One release port may be provided on each of the pair of protection unit side bars 24d facing each other.

The protection unit lower fin plate may be formed in such a manner that the concave and convex parts obliquely extend as well as the heat exchange unit second discharge-side fin plate 22r, and the protection unit upper fin plate may be formed in such a manner that the concave and convex parts obliquely extend as well as the heat exchange unit second supply-side fin plate. In this case, preferably, the release ports are formed at a point facing an end portion of the protection unit lower fin plate in one protection unit side bar 24d among the pair of protection unit side bars 24d facing each other in the width direction, and the release ports are formed at a point facing an end portion of the protection unit upper fin plate in the other protection unit side bar 24d.

Positions where the release ports are provided in the protection unit main body 24a are arbitrary as long as the fluid flowing into the internal space 32 of the protection unit main body 24a can be efficiently released. For example, in the above embodiment, the release ports 24m are respectively provided in the protection unit side bars 24d arranged in one end portion and the other end portion of the protection unit main body 24a in the longitudinal direction of the flow passages 30. However, the release ports may be respectively provided in the protection unit side bars 24d arranged in one end portion and the other end portion in the width direction of the protection unit main body 24a. It should be noted that in order to efficiently release the fluid, the release ports are preferably arranged at two points of the protection unit main body 24a which are away from each other.

Figure 14:
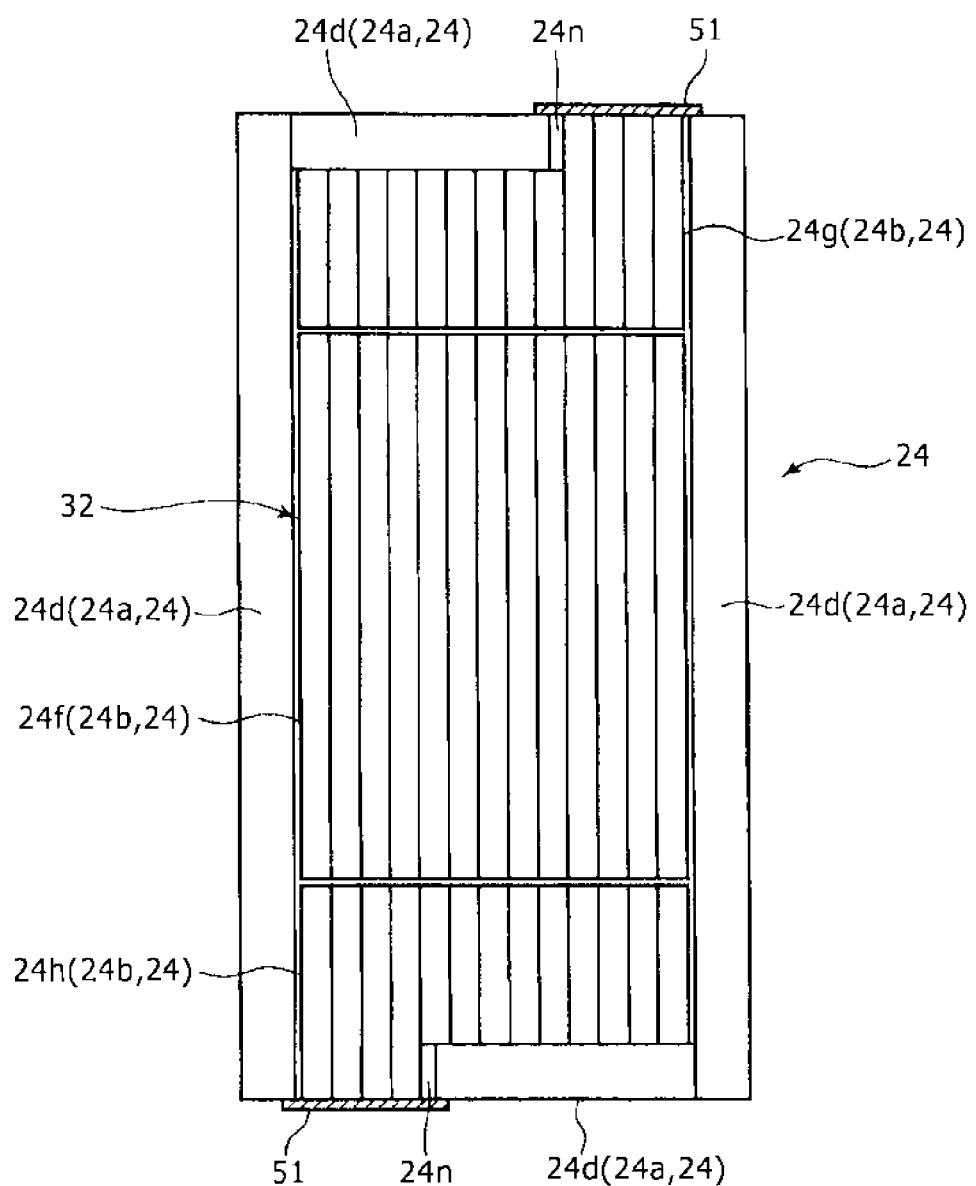
FIG. 14 is a plan view of a protection unit forming a plate fin heat exchanger according to another modified example of the present invention, the view corresponding to FIG. 4.
Figure 15:
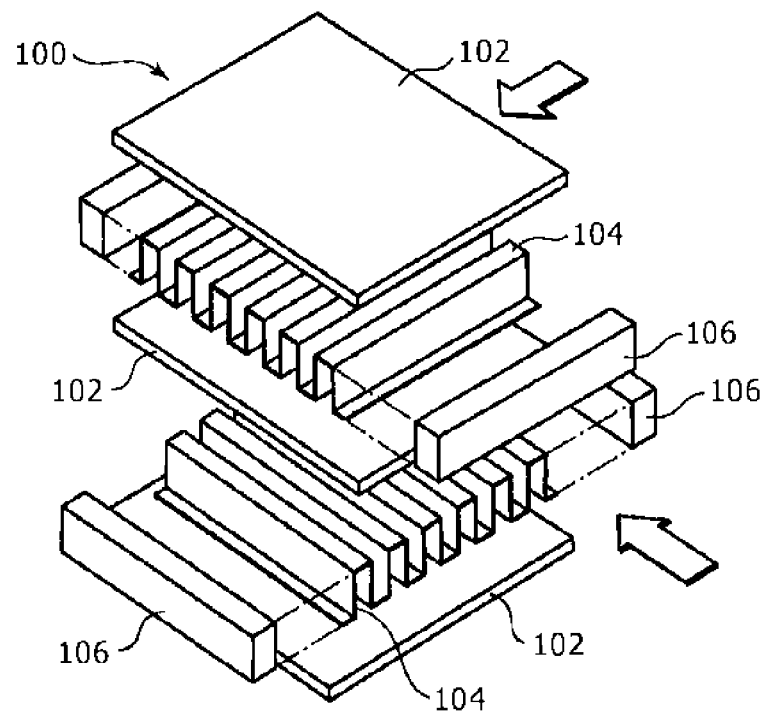
FIG. 15 is an exploded perspective view of a heat exchange unit of a conventional plate fin heat exchanger.
Figure 16:
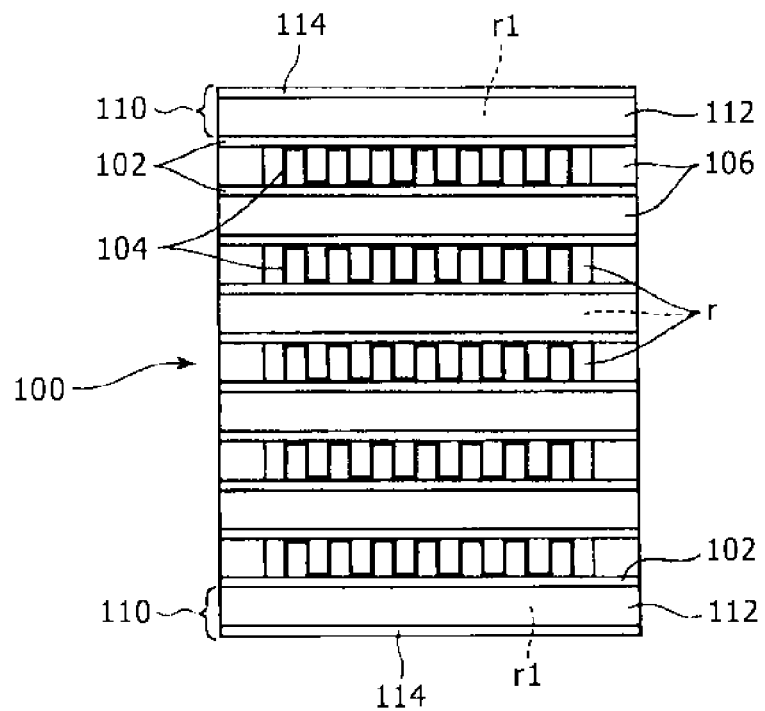
FIG. 16 is a front view of the heat exchange unit of the conventional plate fin heat exchanger.

A shape of the release ports is arbitrary and appropriately set in accordance with the positions where the release ports are provided and various conditions. For example, a part of the protection unit side bar 24d ranging over a particular range in the longitudinal direction may be omitted all, and the omitted part may serve as a release port. Specifically, as shown in FIG. 14, by making two protection unit side bars 24d extending in the width direction of the protection unit 24 as short as not reaching the protection unit side bars 24d extending in the longitudinal direction of the protection unit 24, spaces may be formed between end portions of the protection unit side bars 24d extending in the width direction and the protection unit side bars 24d extending in the longitudinal direction, so that the spaces may serve as release ports 24n. In this case, the release ports 24n are preferably closed by the scaling materials 51 so that the outside of the release ports 24n is covered.

In the above embodiment, the outer plate 24e is attached to the protection unit side bars 24d and the protection unit fin plate 24b via the bonding plate 24c in the protection unit 24. However, the outer plate may be directly attached to the protection unit side bars 24d and the protection unit fin plate 24b. In this case, a layer of brazing filler material is formed on one surface of the outer plate, and the outer plate may be brazed to the protection unit side bars 24d and the protection unit fin plate 24b with using the brazing filler material.

In the above embodiment, the example that the protection unit fin plate 24b is formed by the protection unit center fin plate 24f, the protection unit upper fin plate 24g, and the protection unit lower fin plate 24h is shown. However, the configuration of the protection unit fin plate is not limited to such an example. That is, the protection unit fin plate may be formed by a single fin plate or may be formed by two or four or more fin plates.

What is claimed is:

1. A method for repairing a plate fin heat exchanger comprising a heat exchange unit inside which a plurality of flow passages is provided so as to be layered and heat exchange is performed between fluids flowing through the flow passages; and
    a pair of protection units arranged on both outer sides of said heat exchange unit in the layering direction of the flow passages, the protection units for protecting said heat exchange unit,
    wherein said heat exchange unit has a plurality of partition walls aligned at intervals in such a manner that the flow passage is formed between said adjacent partition walls, and a heat exchange unit fin plate which is arranged in the flow passage for coupling said partition walls facing each other across the flow passage, and said protection unit has a protection unit main body attached to the outermost partition wall so as to form an internal space between said protection unit main body and said outermost partition wall, and a protection unit fin plate arranged in the internal space of said protection unit main body, the protection unit fin plate for coupling an outer surface of said outermost partition wall and an inner surface of said protection unit main body facing the outer surface,
    wherein said protection unit fin plate of said protection unit has such strength that a coupling state between the outer surface of said outermost partition wall and the inner surface of said protection unit main body facing the outer surface is maintained even in a case where an inner pressure set as a design pressure for a part of said heat exchange unit constituting the outermost-layer flow passage adjacent to said protection unit is applied to the internal space of said protection unit main body of said protection unit, the plate fin heat exchanger further comprising a release portion for, in a case where the fluid flows into the internal space, releasing the fluid to an exterior is provided in said protection unit main body of said protection unit,
    wherein the release portion is adapted such that, in a case where a damage such as breaking or cracking is generated in the outermost partition wall and fluid flows into the internal space of the protection unit main body, this fluid flowing into the internal space of the protection unit main body is emitted to the atmosphere through the release portion, the method comprising:
    a sealing step of bringing said release portion into a sealed state in a case where said outermost partition wall is damaged and a damage portion providing communication between the outermost-layer flow passage and the internal space of said protection unit main body is formed.

2. The repair method for the plate fin heat exchanger according to claim 1, wherein
    said protection unit fin plate of said protection unit has pressure-resistance strength which is not less than pressure-resistance strength of said heat exchange unit fin plate arranged in the outermost-layer flow passage adjacent to said protection unit.

3. The repair method for the plate fin heat exchanger according to claim 1, wherein
    said release portion includes a release port formed in said protection unit main body, and a sealing material for sealing the release port in a state that the inner pressure of the internal space of said protection unit main body is not more than a predetermined pressure, whereas opening the release port in a case where the inner pressure of the internal space of said protection unit main body exceeds the predetermined pressure.

4. The repair method for the plate fin heat exchanger according to claim 1, wherein a material of said heat exchange unit and said protection units is an aluminum alloy.

5. The repair method for the plate fin heat exchanger according to claim 1, further comprising an opening formation step of forming an opening for providing communication between the internal space of said protection unit main body and the outermost-layer flow passage adjacent to the internal space on said outermost partition wall.

6. A pressure resistance test for the plate fin heat exchanger repaired with the repair method according to claim 1, wherein
    an inner pressure set as the design pressure for the part of said heat exchange unit constituting the outermost-layer flow passage adjacent to said protection unit is applied to the internal space of said protection unit main body of said protection unit so as to confirm that said protection unit has such a pressure resistance performance that said protection unit is not broken even when said inner pressure is applied.

* * * * *